Feb. 14, 1956  S. E. SELINKER ET AL  2,734,756
MULTI-ENTRY BOOKKEEPING SYSTEMS
Filed Aug. 30, 1952  3 Sheets-Sheet 2
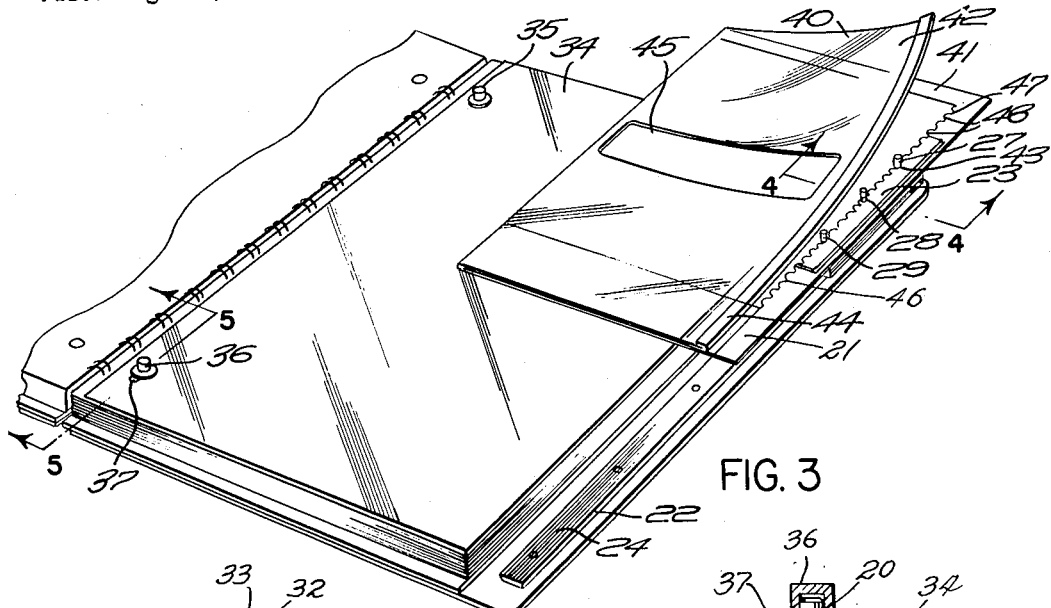
FIG. 3
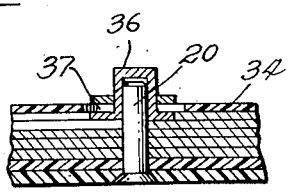
FIG. 4
FIG. 5
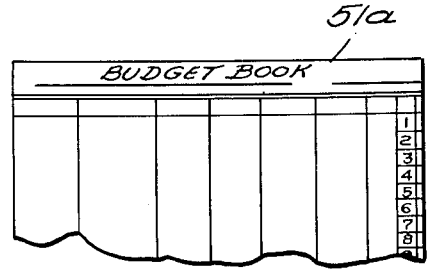
FIG. 7
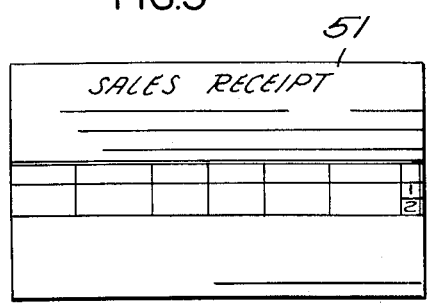
FIG. 6
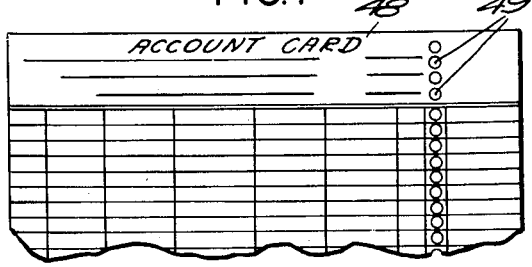
FIG. 8
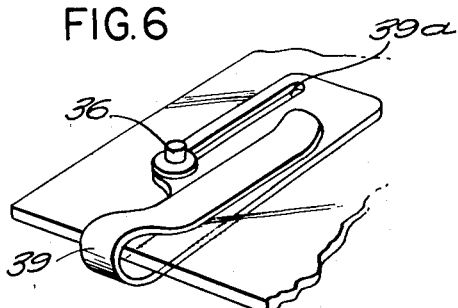
FIG. 9
INVENTORS
Solomon E. Selinker
BY Samuel M. Blaknitz
Nathaniel Frucht
ATTORNEY Feb. 14, 1956   S. E. SELINKER ET AL   2,734,756
MULTI-ENTRY BOOKKEEPING SYSTEMS
Filed Aug. 30, 1952   3 Sheets-Sheet 3

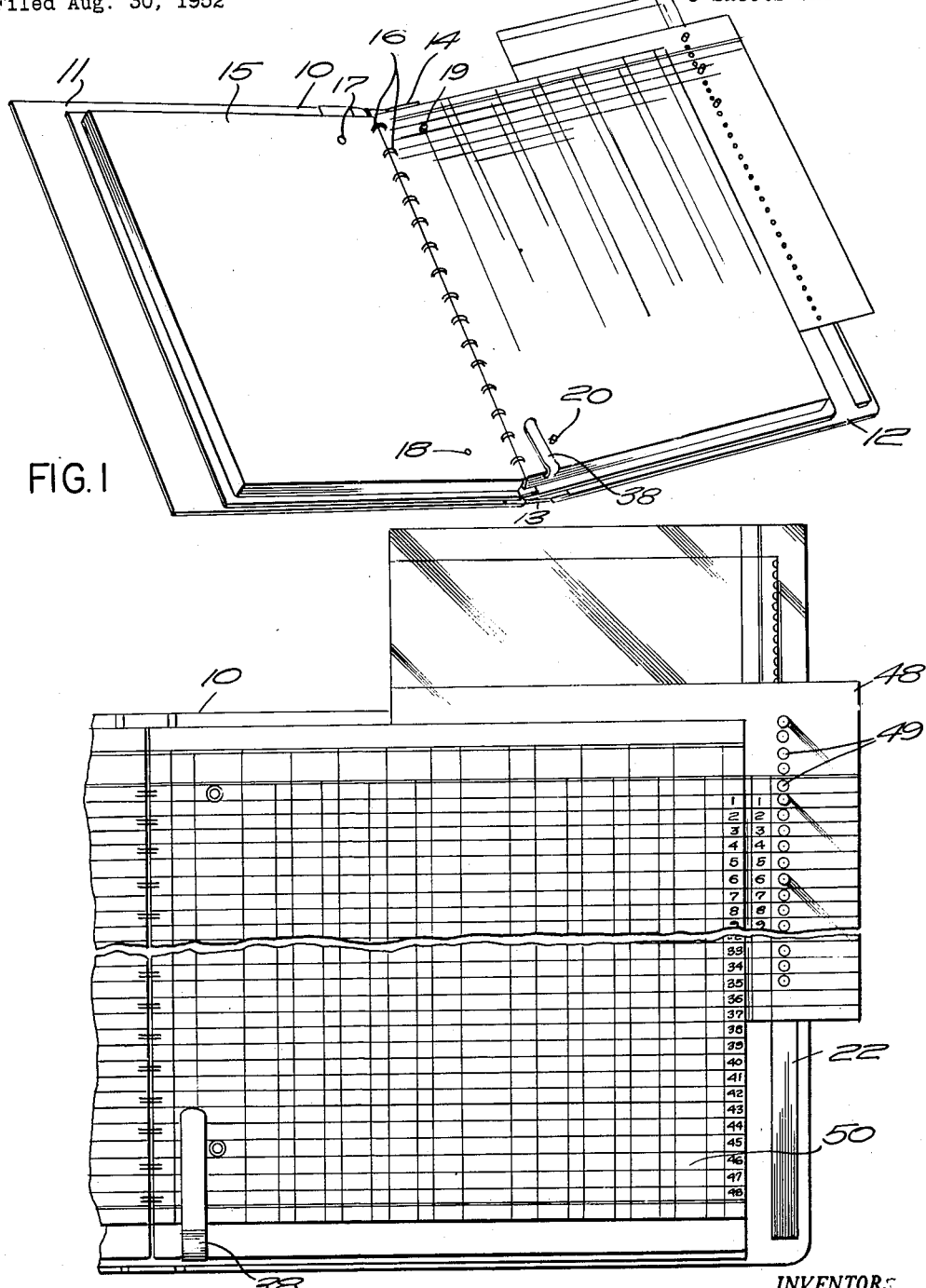

INVENTORS
Solomon E. Selinker
BY Samuel M. Beckowitz
Nathaniel Frucht
ATTORNEY

United States Patent Office 2,734,756
Patented Feb. 14, 1956

2,734,756

MULTI-ENTRY BOOKKEEPING SYSTEMS

Solomon E. Selinker and Samuel M. Berkowitz,
Providence, R. I.

Application August 30, 1952, Serial No. 307,266

6 Claims. (Cl. 282—8)

The present invention relates to bookkeeping systems, and has particular reference to a novel arrangement for bookkeeping recording.

The principal object of the invention is to provide a bookkeeping arrangement whereby entry of bookkeeping records is greatly simplified.

Another object of the invention is to provide a bookkeeping arrangement which may be employed effectively for multi-record entries, such as sales record arrangements whereby simultaneous entries on sales sheets, customer statements or account books and account cards are made, or pay roll arrangements whereby simultaneous entries on an employee's pay statement, pay roll journal, and pay earnings record are made.

An additional object of the invention is to provide simple cooperating control holders for bookkeeping record arrangements, whereby a master sheet such as a sales sheet, and associated sheets such as a statement or an account book and an account card, are aligned so that an entry on the sales sheet is simultaneously entered on the statement or account book and the account card, or when used for a pay roll arrangement, a master sheet pay roll record is used with a check or earnings statement and a pay record, whereby an entry on the pay roll sheet is simultaneously entered on the employee's pay card and the employee's check or earnings statement.

Another object of the invention is to provide a self-adjusting plastic sheet backing with a clip to hold the master sheet and the associated sheets in aligned relation and to provide a stiff writing board for the simultaneous entry.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a perspective view of the novel bookkeeping arrangement;

Fig. 2 is a plan view, partly broken away, of the novel bookkeeping arrangement in recording position;

Fig. 3 is a perspective view of the primary and secondary holders with the plastic backing sheet and plastic pocket in holding positions;

Fig. 4 is a section on the line 4—4 of Fig. 3, parts being omitted;

Fig. 5 is a section on the line 5—5 of Fig. 3;

Fig. 6 is a plan view of one form of a customer's receipt;

Fig. 7 is a partial plan view of a weekly or monthly budget book;

Fig. 8 is a partial plan view of an account card;

Fig. 9 is a perspective view of a cut-away portion of the plastic backing sheet showing a modified form of the clip attachment;

Figure 10:
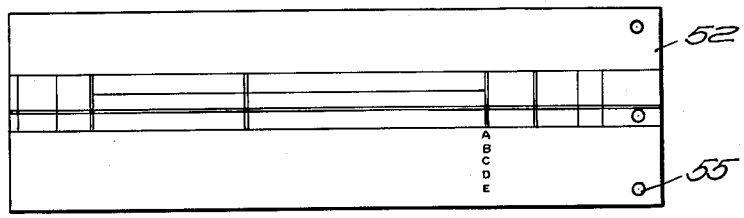
Fig. 10 is a plan view of one form of an employee's earnings statement.

It has been found advantageous to provide a bookkeeping arrangement which can be used effectively for simplifying the entry of multiple identical records. To this end, we provide a primary holder which removably holds a filler of master sheets such as a book of sales records of a pay roll journal. Attached to the primary holder as a cooperative element is a secondary holder comprising a runner, a slidable aligning and an auxiliary sheet holding mechanism, a stiff backing sheet with a clip attachment is used in cooperation with the primary holder. When applied to the keeping of sales records, for example, the arrangement is employed and used by first placing the master sales sheet in position on the primary holder and then attaching a statement or account book pocket with an account book or statement inserted therein, and an account card, onto the secondary holder, which is adjustable to selectively move the account book or statement and the account card to align a particular space with a desired line of the master sales sheet, whereby the statement entries for each sale are simultaneously entered in sequence on the sales sheet, the account book or statement and the account card. As applied to the keeping of pay roll records, the arrangement is used by attaching pay record sheets or cards and a pay statement onto the sliding secondary holder, which is moved to align the wage statement or check and the record card for an individual employee with the proper line of the master pay roll sheet, whereby the wage entries for each employee are consecutively entered on the pay roll sheet and are also entered as weekly entry on the individual employee pay card and as an entry on the employee statement or check.

Referring to the drawings, the novel bookkeeping arrangement illustrated comprises a metal book binder 10 having a front plate 11, a rear plate 12 and a back plate 13 hinged to the front and rear plates, the rear plate having a primary holder 14 which is in the form of an elongated strip and is integrally mounted on the rear plate adjacent the back plate.

The back plate 13, see Fig. 1, is of sufficient height to permit insertion of a book of sheets such as pay roll sheets which are connected with standard ring binders 16; the sheets have spaced side perforations 17, 18 for mounting on spaced metal holding posts or pins 19, 20 which project upwardly from the primary holder 14.

A secondary holder 21, see Fig. 3, having a metal slide base 22 and a slidable aligning and auxiliary holding mechanism 23 is secured to the back plate adjacent the right edge thereof. The slide base 22 has a slide surface 24 and inwardly inclined sides 25, see Fig. 4, on which the auxiliary holding mechanism 23 is mounted, the auxiliary holding mechanism 23 being channeled as indicated at 26 to slidably seat over the sides 25. The auxiliary holding mechanism has an upper pin 27, a center pin 28 and a lower pin 29 which projects upwardly, the center pin 28 being hollow, see Fig. 4, and internally threaded at its upper end 30 to receive the threaded lower end 31 of a manually movable lock element 32 which extends upwardly through pin 28 and has an enlarged knurled head 33, whereby the auxiliary holding mechanism may be moved to any desired position on the base 22 and then locked in place.

A backing sheet 34, preferably of plastic, see Fig. 3, is utilized to provide a stiff support for the sheets on which the entries are being recorded, as described more in detail below. Spaced pin receiving elements 35 and 36 are secured to the backing sheet and, being hollow, see Fig. 5, seat over the pins 19 and 20 to hold the backing sheet in place in the binder. Pin 36 is slidably secured in a slot 37 of the backing sheet, whereby expansion and contraction of the plastic and irregularities in spacing of the primary holder pins are compensated for.

A lock clip 38 is employed to hold the sheets in place, the clip being detachable from the backing sheet as shown in Fig. 1; or a modified lock clip 39 having a slot 39a may be slidably secured to the base of the element 36, as shown in Fig. 8, whereby the clip 39 can slide along the element 36 to hold the paper sheets in place on the backing sheet.

The paper sheets mentioned above may be a series of sales record sheets or forms used for simultaneous entries by first placing the master sheets 15 in the binder 11 as shown in Fig. 1, and laying the backing sheet 34 on the binder underneath the top master sheet. A plastic pocket 40, see Fig. 3, having a back flap 41 and a front flap 42 is placed over the backing sheet. This plastic pocket 40 has aligning holes 43 for seating on the pins of the secondary holder; the front flap, which folds over in spaced relation to the edge of the back flap, has a reinforced edge 44 for manual grasping and a window opening 45. The statement has scallop indentations 46 on its outer edge 47 and is first aligned for recording entries thereon by placing an edge scallop indentation which corresponds to the desired entry recording space against the center pin 28.

The account card 48, which has perforated holes 49 along the right edge, see Fig. 8, is placed over the plastic back with two interposed carbon sheets, see Fig. 2, and is aligned on the secondary holder by placing the hole corresponding to the desired entry recording space over the center pin, see Fig. 1.

The master sheet 50 is turned over onto the account card with an interposed carbon sheet, see Fig. 2. The secondary holder slidable mechanism is then moved to bring the aligned account book and account card into alignment with the master sheet for recording the entries on the desired line, all being locked in place by lock turning the center pin. Before the entries are actually made, the clip 38 is inserted to grip the backing sheet, the master sheet and the auxiliary sheets, against relative displacement from their set aligned position.

If desired, a customer's sales receipt form 51, or budget 51a, see Figs. 6 and 7, may be inserted with an interposed carbon sheet when making entries on the master sheet of the sales bookkeeping arrangement.

The application of the novel bookkeeping arrangement to a system of keeping sales records as described above provides a very effective method of providing a number of identical records. Similarly, the novel bookkeeping arrangement can be used for any multi-record system. Thus, the arrangement is readily applied to a pay roll record system.

Figure 11:
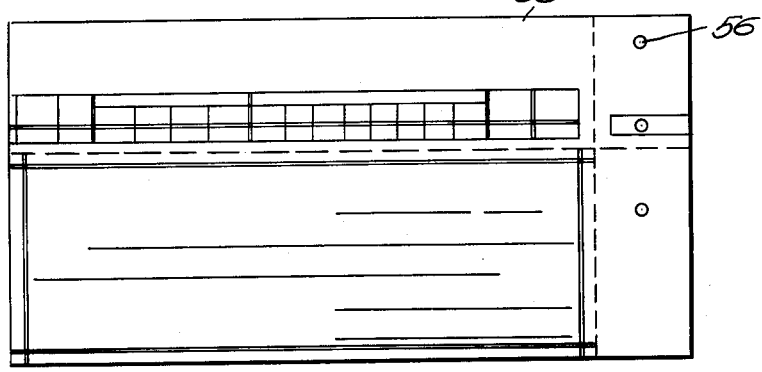
Fig. 11 is a plan view of an employee's combination pay statement and check.
Figure 12:
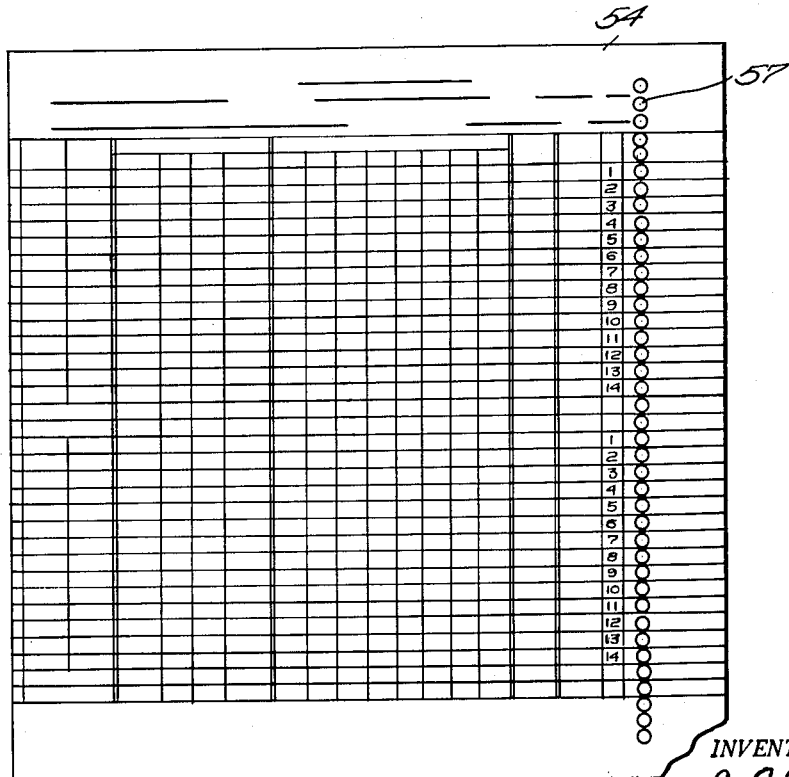
Fig. 12 is a plan view of a section of an employee's earning card.

An employee's pay check form 52, see Fig. 10, or an employee's combination pay receipt and check form 53 in Fig. 11, and an individual pay card form 54 as shown in Fig. 12 may be all used with a pay roll journal in a pay roll bookkeeping arrangement. The supplemental forms are aligned on the secondary holder by placing their perforated holes, shown at 55, 56 and 57, see Figs. 9, 10 and 11, so that the desired writing spaces are in line with the center pin 28, the forms having interposed carbon sheets. The slidable secondary holder is then moved in alignment with the master pay roll journal sheet and then locked in position, whereby a pay entry on the journal is simultaneously duplicated on the other record sheets.

The operation of the novel bookkeeping arrangement is now clear. Although it may be used for a variety of different purposes, the discussion of its employment is limited by way of example, to use in sales register record bookkeeping and in pay roll record bookkeeping, the arrangement, however, being readily applicable to other bookkeeping records.

As employed for use in the sales register system of bookkeeping, a filler of sales sheets is set in the binder on the primary holder, and the sheets are turned to bring a blank sheet in position for entry; the plastic backing sheet is placed beneath the blank sales sheet with its retaining holes set on the filler retaining pins of the primary holder. A carbon sheet is then placed on the plastic backing sheet. The transparent pocket is then placed on the pegs of the auxiliary holder and positioned on top of the plastic backing sheet and beneath the carbon sheet. The statement or account book is now placed in the transparent pocket with the appropriate writing line at the center locking peg, and the account card is placed on the center locking device over the first carbon sheet, with the appropriate writing line on the center locking peg. A second carbon sheet is now placed on the account card and behind the sales sheet. The clip is then inserted to hold the book open to the correct page and to retain the parts together, and the auxiliary holder is moved so that the center locking peg is in line with the writing space on the blank filler sheet positioned on the primary holder, wherefrom the locking peg is locked.

The sales entries are now recorded on the sales sheet; this makes an identical entry on the statement or account book and the account card. The statement or account book and the account card are then removed; the slidable auxiliary holder is moved down one journal line, a new account card and the statement or account book are placed in position, and a new entry is made.

The employment for use in the pay roll system of bookkeeping is now also clear. The book of journal sheets is set on the primary holder, and the sheets turned to bring a blank journal sheet in place; the plastic backing sheet is placed beneath the blank journal sheet with its retaining holes set on the retainer pins of the primary holder. Two carbon sheets are placed on the plastic sheet and beneath the journal sheet.

A complete set of employee's earning cards are then placed on the slidable aligning and auxiliary holding mechanism, under the carbon sheet, with the appropriate writing line at the center locking peg. Another carbon sheet is placed over the employee's earning card and underneath the blank journal sheet. Under the top carbon sheet is placed an employee's pay statement or check with the writing line at the center locking peg, and the clip is inserted to keep the journal open. The slidable auxiliary holder is now moved so that the center locking peg is in line with the next writing space on the journal sheet, and the locking peg is then locked.

The entries are now made, the employee's pay roll data being recorded on the journal sheet; this makes an identical entry on the employee's earning card and the employee's receipt or statement. The top employee's earning card and the employee's statement or check are now removed; the aligning and auxiliary sheet holding mechanism are moved down one journal line, a new employee's receipt is placed in position on the auxiliary sheet holding mechanism, and a new pay entry is made.

It is thus clear that a complete sales or pay roll record is obtained where an entry is made on the journal blank sheet, and that errors in copying are eliminated. Further, the journal sheets are fixed in the holder, and do not travel, whereby the entries are in order and there is no creasing or damaging of the journal sheets.

Although we have described a specific construction of a novel arrangement of parts for carrying out the bookkeeping of sales or pay roll identical multiple entries, it is obvious that changes in the sizes of material of the parts may be made to suit different sale, pay roll or other bookkeeping requirements, without departing from the spirit and the scope of the invention as defined in the appended claims.

We claim:

1. In a bookkeeping arrangement for selectively recording multiple identical entries simultaneously on multiple separate forms having a primary holder equipped with spaced upwardly extending book mounting pins, a plastic backing sheet having an opening and an elongated slot in vertical alignment, said opening and slot having hollow pins secured therein for mounting said plastic sheet on said primary holder mounting pins, said hollow pin in said slot being slidably movable vertically within the slot, whereby irregularities in spacing of the primary holder mounting pins are compensated.

2. In a bookkeeping arrangement for selectively recording multiple identical entries simultaneously on multiple separate forms having a primary holder and a secondary holder having an auxiliary holding mechanism, said primary holder and auxiliary holding mechanism equipped with spaced upwardly extending pins, a plastic pocket, said plastic pocket having a back flap with openings for positioning said plastic pocket on the pins of said auxiliary holder mechanism pins, and a front flap, the front flap being folded over in spaced relation to the edge of the back flap, said front flap having a reinforced grasping strip extending the length of its free longitudinal edge and a window opening adapted to be aligned with one of said upwardly extending pins, whereby entries can be recorded through the window opening on entry spaces of sheets inserted between the flaps.

3. In a bookkeeping arrangement for selectively recording multiple identical entries simultaneously on multiple separate forms having a primary holder equipped with spaced upwardly extending book mounting pins, a plastic backing sheet having an opening and an elongated slot in vertical alignment, said opening and said slot having hollow pins secured therein for mounting said plastic sheet on said primary holder mounting pins whereby a series of sheets are supported on said plastic sheet, said hollow pin in said slot being slidably movable vertically within the slot and having a vertically slidable clip securely attached thereto, whereby the series of sheets are securely gripped to the backing sheet.

4. In a bookkeeping system, a book binder having a support plate for a book of master sheets having entry spaces, a primary holder at one side of the plate having entry spaces, a primary holder at one side of the plate having spaced upwardly extending retaining pins, said master sheets having spaced perforations for seating on said primary holder pins, a secondary holder at the opposite side of the plate including a slide base and auxiliary holding mechanism slidably mounted on the base for receiving a series of auxiliary forms having entry spaces and positioning the auxiliary forms over the master sheets, said auxiliary holding mechanism being slidable on the base to align the auxiliary form entry spaces with selected master sheet entry spaces, a backing sheet having spaced perforations for releasable mounting on the plate retaining pins for flatly supporting the top master sheet, the auxiliary forms, and interposed carbon sheets in multiple entry position, and releasable means for firmly holding the top master sheet, the auxiliary forms, and the interposed carbon sheets to the backing sheet.

5. In the combination of claim 4, said auxiliary holding mechanism having upwardly extending pins and said auxiliary forms having performations for receiving said auxiliary holding mechanism pins.

6. In the combination of claim 5, a plastic sheet adapted to be mounted on the auxiliary holding mechanism pins and having a window opening for alignment with one of said holding mechanism pins.

References Cited in the file of this patent

UNITED STATES PATENTS

| 2,163,193 | Cutchfield | June 20, 1939 |
| 2,485,513 | Straus | Oct. 18, 1949 |

FOREIGN PATENTS

| 455,087 | France | May 14, 1913 |
| 121,832 | Switzerland | Aug. 16, 1927 |
| 155,364 | Germany | Jan. 10, 1939 |
| 570,726 | Great Britain | July 19, 1945 |